UNITED STATES PATENT OFFICE.

FRANK L. BARTLETT, OF PORTLAND, MAINE, ASSIGNOR TO THE AMERICAN ZINC LEAD COMPANY, OF SAME PLACE.

PAINT-PIGMENT.

SPECIFICATION forming part of Letters Patent No. 477,488, dated June 21, 1892.

Application filed October 25, 1889. Serial No. 328,177. (Specimens.)

*To all whom it may concern:*

Be it known that I, FRANK L. BARTLETT, a citizen of the United States, residing at Portland, in the county of Cumberland and State of Maine, have invented certain new and useful Improvements in Paint-Pigments, of which the following is a specification.

My invention relates to a new and improved paint-pigment, which I have discovered and practically manufactured.

Hitherto sublimed lead and zinc pigments have been made by various processes, but none have been made, so far as I am aware, which would not change color on exposure to the air, or harden and set when ground in linseed-oil.

In manufacturing this pigment I make use of low-grade refractory zinc ores which cannot profitably be worked by the ordinary processes of smelting. An ordinary example of such ores contains from twenty per cent. to forty per cent. of zinc, with from ten to fifteen ounces of silver. They also usually contain some gold and copper. The lead content is below ten per cent., while the sulphur is present from twenty-five per cent. to forty per cent.

In manufacturing the pigment the raw sulphuret ore is crushed and mixed with about seventy-five per cent. of its weight of any kind of cheap fine coal or coal-culm, sawdust, petroleum residuum, or the like, care being taken that the fuel is in a fine state of division and that it contains some hydrocarbon. It is also necessary that the amount of sulphur present shall be equal to or in excess of the amount of zinc. The ore is then burned in a suitable furnace in the presence of an air-blast, which is blown through the mass of ore and fuel. An air-blast is also introduced directly above the mass of ore. The zinc, lead, and other volatile metals are thus sublimed and pass off in the form of a fume, which is collected in a bag-room or by any suitable means. The introduction of the air-blast, as above described, immediately above the mass of ore results in keeping up the heat and destroying the sulphuric acid, which would otherwise pass off with the fumes. The fumes which are thus collected and which are the result of the first step of the process, consist, mainly, of zinc oxide, lead sulphate, and zinc and lead sulphites, with the sulphites of arsenic and other volatile metals, sulphurous acid and carbon, and is of a dark-grayish color. This fume is then placed in a furnace or retort out of contact with the products of combustion and is heated to a low red heat, at the same time being gently and continuously stirred in the presence of air and sulphurous gas for a considerable length of time, (usually about thirty minutes,) after which it is removed and allowed to cool. By this last manipulation the sulphurous acid, sulphites, arsenic, and other loose sulphur compounds are driven off and zinc, lead, oxygen, and sulphur remain chemically combined in the form of a dense white homogeneous pigment or powder having many of the characteristics of pure white lead, the oxygen being in excess over and above what would be necessary to convert the metals into their oxides and the sulphur into sulphates.

The pigment thus produced is perfectly homogeneous in character, the elements being united in chemical combination and not in the form of a mechanical mixture. This is shown by the fact that when triturated in water no separation of the lead and zinc can be effected, and when allowed to settle through the water the upper portion contains the same percentage of lead as the lower. It is further shown by the fact that it cannot be imitated by any chemical process or by mixing two or more elements. Neither can any mechanical separation be effected, and the microscope fails to show anything but a homogeneous product.

This pigment when ground in oil weighs nearly or quite as much as straight white lead. It will not settle or harden. It covers as well and is as durable as the best white lead of commerce. Like white lead it whitens on exposure, and unlike the sublimed lead hitherto made it does not turn yellow.

An analysis of a fair sample gives the following result:

| | |
|---|---|
| Zinc, metallic | 47.33 |
| Lead, metallic | 24.92 |
| Sulphur | 2.96 |
| Moisture, oxide of iron, soluble zinc sulphate | .45 |
| Oxygen | 24.34 by dif. |
| Total | 100.00 |

These proportions will be varied somewhat, according to the relative quantities of zinc, lead, and sulphur in the ore used.

In making the combinations of the elements as found above it will be seen at once that there is an excess of oxygen over what is required to combine with the sulphur to make sulphates and with the zinc to make zinc oxide. There is no satisfactory way to account for this excepting we call the lead an oxysulphate—that is to say, sulphate of lead containing one equivalent of extra oxygen. This fact is further proved in this way: When pure zinc ore free from lead is worked by the same process and made into zinc oxide, it invariably contains from seventy-eight per cent. to seventy-nine per cent. of metal, thus proving that the zinc is not the metal which holds the excess of oxygen. It is this excess of oxygen, as explained, which constitutes the peculiarity of my product and which seems to give to it its peculiar physical properties.

I claim—

The herein-described pigment, consisting of a stable chemical compound having in combination zinc, lead, sulphur, and oxygen, and composed principally of zinc oxide and sulphate of lead, but having in combination a quantity of oxygen more than sufficient to form the said oxide and sulphate, substantially as described.

In testimony whereof I affix my signature in presence of two witnesses.

FRANK L. BARTLETT.

Witnesses:
S. W. BATES,
WILBUR F. LUNT.